United States Patent [19]
Wolcott

[11] 4,025,271
[45] May 24, 1977

[54] APPARATUS FOR FLARING PLASTIC TUBING

[76] Inventor: Glenn R. Wolcott, Papco Tool Corporation, 2044 Webster St., Dayton, Ohio 45404

[22] Filed: Aug. 25, 1975

[21] Appl. No.: 607,225

[52] U.S. Cl. .................. 425/318; 425/392; 72/117
[51] Int. Cl.² .......................................... B29C 17/00
[58] Field of Search ... 425/385, 392, 393, DIG. 41, 425/318; 72/117

[56] References Cited
UNITED STATES PATENTS

| | | | |
|---|---|---|---|
| 2,707,511 | 5/1955 | Franck | 72/117 |
| 2,737,225 | 3/1956 | Jasinski | 72/117 |
| 3,262,298 | 7/1966 | Samuels et al. | 72/117 |
| 3,482,282 | 12/1969 | Glasschroeder | 425/318 |
| 3,585,687 | 6/1971 | Bjalme | 425/171 |

*Primary Examiner*—Robert L. Spicer, Jr.
*Attorney, Agent, or Firm*—Biebel, French & Nauman

[57] ABSTRACT

Polybutylene tubing is flared by a method and apparatus wherein the tubing is clamped at a position spaced from the end to be flared, and the projecting end portion is progressively engaged by a rotating flaring member having a working face of special segmental configuration such that as it advances into the tubing, an undulating circulatory pattern is developed in the tubing material accompanied by expansion thereof into the desired flare.

7 Claims, 7 Drawing Figures

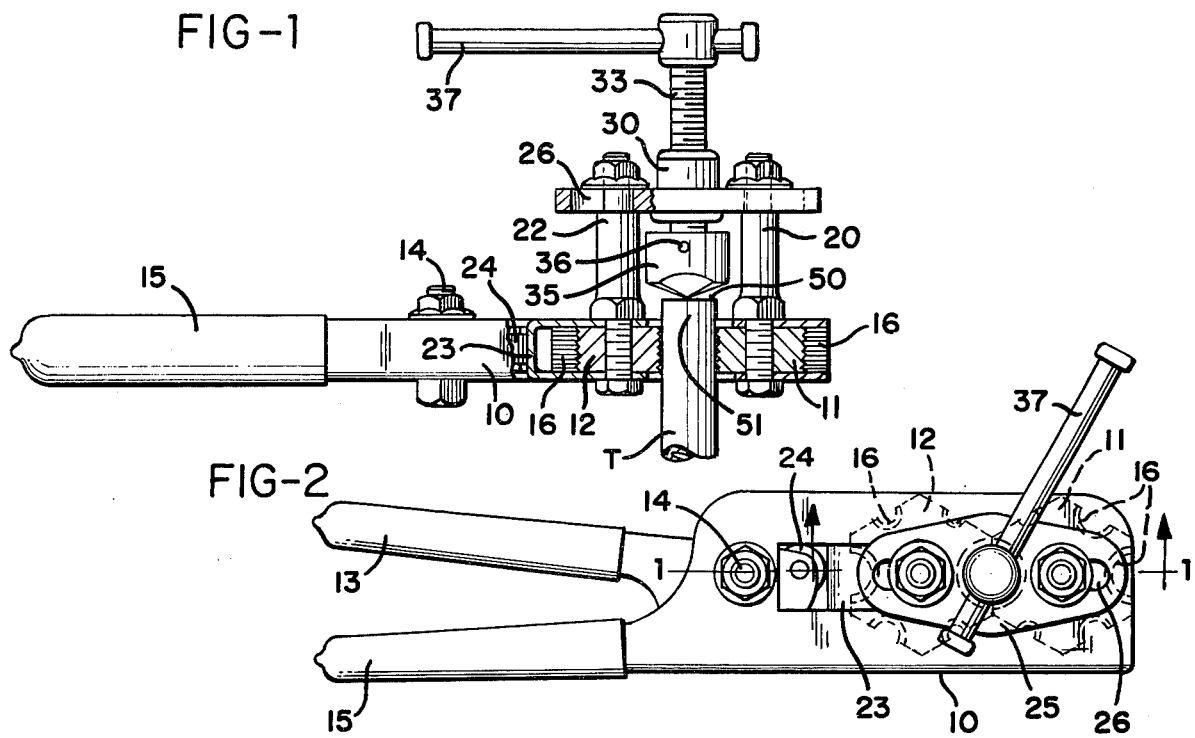
FIG-1
FIG-2
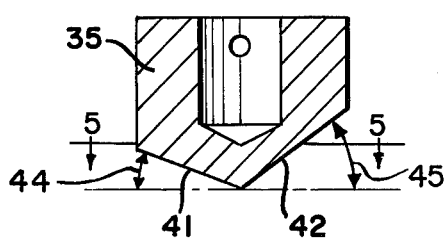
FIG-4
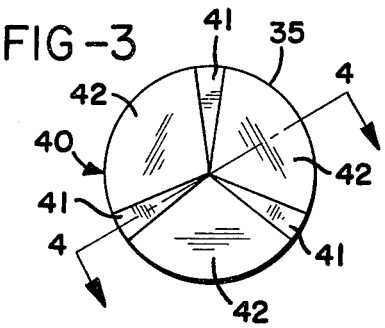
FIG-3
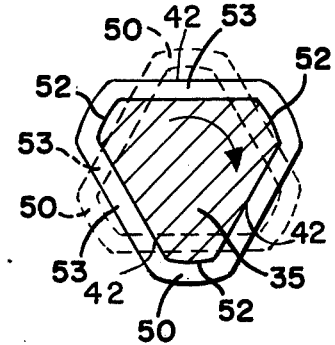
FIG-5
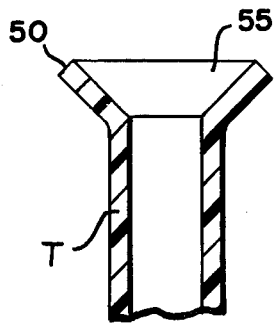
FIG-6
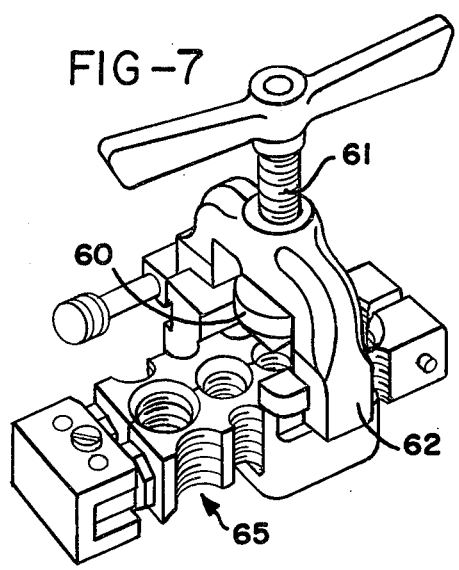
FIG-7

APPARATUS FOR FLARING PLASTIC TUBING

BACKGROUND OF THE INVENTION

This invention relates to the flaring of plastic tubing, and especially polybutylene tubing which has very recently received wide acceptance and approval for installations where copper tubing had previously been the standard material. The invention is concerned with the formation of a flared end on such tubing by which it can be clamped in a suitable two-piece fitting.

The art appears thus far to have had difficulty in conceiving satisfactory apparatus for flaring such plastic tubing. For example, the approach most commonly used requires that a closely fitting threaded mandrel be inserted in the end of the tubing to be flared, and the tube and mandrel are secured in a clamp with the mandrel projecting from the end of the tubing. The flaring member is threaded on the mandrel and includes an annular boss of tapered section which progressively expands the end of the tubing away from the mandrel into a flare. Obvious disadvantages of this approach are that both the clamp and the mandrel must be provided in as many sizes as there are sizes of tubing to be flared, and also that the clamp and flaring unit are separate pieces requiring excessive manual manipulation.

SUMMARY OF THE INVENTION

A primary object of the present invention is to provide simple apparatus for flaring plastic tubing which does not require that a mandrel or other member be inserted in the tubing and which employs a single flaring element for a wide range of commonly used tubing sizes.

In accordance with the invention, a length of plastic tubing is first mounted in a pair of clamping jaws of essentially the same type which are commonly used for copper tubing, but the polybutylene tubing is clamped at a position spaced from its outer end to leave the outer end portion unsupported both internally and externally. A flaring member of special configuration is then moved axially and rotationally against the unsupported end of the tubing, and this flaring member is provided with a working face on its leading end which is of special configuration such that as it moves axially and rotationally against the tubing, it develops an undulating circulatory pattern in the tubing as it progressively expands the outer end portion thereof into the desired flare.

The special configuration of the working face of the flaring member is generally conical but is formed of a series of narrow lands which radiate from the center of the face in alternating relation with relieved areas. In the use of this flaring member, the lands first engage the end of the plastic tubing and act to expand it as the flaring member progressively penetrates the tubing, but as the flaring member rotates, the tube material continually changes its shape as it is first forced outwardly by the several lands but then partially recovers as it tends to flow back into the relieved areas of the working face. The flexing which accompanies the undulating circulatory pattern has a tendency to develop heat in the distorted parts of the tube material, which further aids the flow and setting of the material into the desired flare.

It is accordingly an object of the invention to provide a novel method for flaring polybutylene tubing, by following the steps of first clamping the tubing at a position spaced from the end to be flared and with that end portion projecting from the clamped portion without external and internal support, and then progressively expanding the end of the tube by developing an undulating circulatory pattern in the material thereof as described above.

It is also an object of the invention to provide a novel apparatus for carrying out the method of the invention, and especially to provide a flaring member of novel configuration especially effective for flaring polybutylene tubing.

Other objects and advantages of the invention will be apparent from the following description, the accompanying drawings and the appended claims.

BRIEF DESCRIPTION OF THE DRAWING

FIG. 1 is a side elevation, partly in section on the line 1—1 of FIG. 2, showing a tool for flaring plastic tubing in accordance with the invention;

FIG. 2 is a top view of the tool of FIG. 1;

FIG. 3 is a detail elevation of the working face of the flaring member in the tool of FIGS. 1 and 2;

FIG. 4 is a section on the line 4—4 of FIG. 3;

FIG. 5 is a diagramatic view taken generally as indicated by the line 5—5 of FIG. 3 and illustrating the operation of the flaring member of the invention;

FIG. 6 is a fragmentary section showing tubing with a complete flare in accordance with the invention; and FIG. 7 is a perspective view showing another form of tool incorporating the invention.

DESCRIPTION OF THE PREFERRED EMBODIMENTS

The drawings illustrate the invention as applied to a flaring tool generally of the construction disclosed in Wilks et al. U.S. Pat. No. 2,563,088. In that tool as shown in FIGS. 1 and 2, the main body 10 of the tool is generally channel shaped and encloses a pair of complementary clamping blocks 11 and 12 which are relatively movable into clamping relation with a plastic tube T by means of an outwardly extending handle 13 pivoted on a bolt 14 in the body 10 for movement toward and away from handle portion 15 of the body 10. The clamping blocks 11 and 12 are each provided with a plurality of cut-out portions 16 of various sizes forming clamping jaws for a corresponding range of sizes of tubing T. Unlike the jaws used with copper tubing, however, the jaws 16 do not need to be chamfered as shown in U.S. Pat. No. 2,563,088, because these jaws do not function as female forming members in the flaring of plastic tubing as they do in the flaring of copper tubing.

The clamping block 11 is pivoted on the lower end of a stud 20 mounted in the main body 10 so that block 11 can be rotated to bring the jaws 16 thereof selectively into proper position aligned with the opening 21 in the main body. A second stud 22 forms the pivot for the clamping block 12 and is carried by a yoke 23 which receives clamping block 12 therein and is slidable therewith in the extensions of the opening 21. Handle 13 has a roller 24 thereon which acts as a cam to engage the end of the yoke 23 and thereby to drive the clamping blocks together as the handle 13 is moved toward handle portion 15.

A strap 25 is mounted on the upper ends of the studs 20 and 22 by means of slots 26 which provide for the desired sliding movement of the stud 22 and yoke 23, this movement being enough to provide clearance between the two clamping blocks such that they can be rotated with respect to each other to different indexed positions. The strap 25 includes a boss or collar 30 which is threaded to receive the screw 33 for the flaring member 35 secured on one end thereof as by a pin 36. A handle 37 is mounted in the other end of screw 33. Thus threaded movement of the screw 30 causes movement of screw 33 axially and rotationally toward and away from a piece of tubing T clamped in the jaws 11–12.

The flaring member 35 has a working face 40 which is generally conical but which differs in critical details from the flaring cones commonly used with copper tubing as shown in the above U.S. Pat. No. 2,563,088. Referring to FIGS. 3 and 4, the working face 40 is composed of three equi-spaced land areas 41 alternating with relieved areas 42, all of which radiate from the center of face 40. Each of the lands 41 is defined by a narrow segment of the surface of a cone of relatively large included angle and therefore has a correspondingly curved surface. For example, a flaring member 40 large enough to handle the sizes of polybutylene tubing up to ⅝ inch in diameter need be no more than 15–16 inch in diameter and ¾ inch in axial length. Satisfactory results have been obtained with such a flaring member with each land 41 having an angular dimension of 15° providing a maximum width of ⅛ inch.

The angular relation between each land 41 and the axis of the flaring member appears to be critical. Highly satisfactory results have been obtained in forming 45° flares on polybutylene tubing with the cone of which the lands 41 are segments has an included angle of 140° rather than the 90° cones commonly used to form 45° flares on copper tubing. Thus each land 41 forms an angle 44 of substantially 20° with a radial plane through the axis of the land, and unsatisfactory results were obtained with this angle outside of a range of approximately 15°–25°.

The relieved areas 42 in the working fare 40 are flats extending at a substantially greater angle to a radial plane than the curved lands 41. In the example noted above, each area 42 has a maximum dimension of approximately ⅞ inch, and its center line defines an angle 45 of approximately 31.5° with a radial plane through the axis of member 35. Preferably the edges of each land 41 are radiused rather than sharp to avoid scratching of the tubing to be flared.

FIGS. 1, 5 and 6 illustrate the use of this tool to flare one end of a length of polybutylene tubing T. The tubing is initially clamped in the appropriately sized pair of jaws 16 at a position spaced from the end 50 of the tubing to be flared, so that the end portion 51 of the tubing projects from the clamping blocks without external or internal support. The position of the end 50 is not critical so long as it does not touch the flaring member 35 in the fully retracted position thereof, but there should be a sufficient projecting portion 51 to form the complete desired flare, essentially as shown in FIG. 1.

The flare is formed by rotating the screw 33 to carry the member 35 rotationally and axially against the tubing end 50. As the lands 41 are pressed against the tubing, they force it to expand at the three locations 52 where contact with the lands is made, and as the flaring member continues to advance and rotate, this expanding action of the lands 41 travels around the tubing. However, the portions 53 of tubing material overlying the relieved areas 52 of the flaring member tend to collapse inwardly to compensate for the expansion over the lands 41, as is represented in FIG. 5. The result is the development of an undulating pattern of movement of the tubing material which circulates around the tubing so long as the flaring member continues to advance.

The net result of this action is to distort the tubing material in such manner and to such degree that when the flaring member is retracted, the end portion of the tubing assumes a uniformly flared configuration 55 as shown in FIG. 6, and with the flaring member of the particular design described, this flare will be an accurately formed 45° flare.

A number of factors appear to contribute to this result. One is that the natural resilience of polybutylene causes it to recover to that extent from the greater angle of distortion effected by the 140° angle included by the lands 41. Another factor is that the heat generated by the flexing of the tubing material apparently aids in the permanent flow and setting of the flared material. It is merely necessary to force the flaring member far enough into the tubing until the operator judges by eye that a flare of the proper depth has been formed.

The principles of the invention are applicable to other designs of flaring tools, and as one example, FIG. 7 shows a tool of two-piece construction in accordance with Franck U.S. Pat. No. 2,892,480. In FIG. 7, the flaring member 60 is secured on a screw 61 threadedly mounted in a yoke-shaped tool body 62. The clamping unit 65 is separate from the tool body 62 and is slidably received between the open ends of the yoke arm portions of body 62. So long as the flaring member 60 is of essentially the same characteristics described for flaring member 35, this type of flaring tool can be used equally effectively for the flaring of polybutylene as described in connection with FIG. 5.

It is to be understood that while the invention is described and claimed with special reference to polybutylene tubing, it can be practiced with other plastic materials of comparable physical properties. All references to polybutylene therefore are to be understood as illustrative and not as limiting the scope of the invention.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention.

I claim:

1. Apparatus for flaring an end of a length of polybutylene tubing, comprising,
   a. a tool body,
   b. a male flaring member having a central axis and a generally conical working face located on one end thereof in centered relation with said axis,
   c. said face including a plurality of relatively narrow lands radiating from the center thereof in angularly spaced relation and constituting a minor fraction of the total area of said face,
   d. each of said lands being a segment of the surface of a cone defining an angle of substantially less than 45° with a radial plane through the axis of said flaring member,
   e. the remainder of said face being composed of an equal plurality of relieved areas alternating with said lands and each defining a substantially larger angle with said radial plane than said lands, f. means mounting said flaring member on said tool body for axial and rotational movement, and g. means for clamping a length of tubing to be flared at a predetermined position in said tool body in axial alignment with said flaring member and with an unsupported end portion of said tubing projecting from said clamping means toward said forming member.

2. Apparatus as defined in claim 1 wherein there are a total of three of said segments, and each said segment is of the same substantially smaller angular extent than each of said relieved areas.

3. Apparatus as defined in claim 2 wherein each of said lands is approximately 15° in angular extent.

4. Apparatus as defined in claim 1 wherein said angle is within the range of 15° to 25°.

5. Apparatus as defined in claim 1 wherein said angle is approximately 20°.

6. Apparatus as defined in claim 1 wherein each of said relieved areas is a flat surface whose radial center line defines an angle with said radial plane which is substantially greater than said angle defined by each of said lands and said plane.

7. Apparatus as defined in claim 6 wherein the edges of each of said lands are radiused to avoid scratching of the tubing to be flared.

* * * * *